(12) United States Patent
Yang

(10) Patent No.: US 8,086,037 B2
(45) Date of Patent: Dec. 27, 2011

(54) TILING AND MERGING FRAMEWORK FOR SEGMENTING LARGE IMAGES

(75) Inventor: Zongxiang Yang, Superior, CO (US)

(73) Assignee: Microsoft Corporation, Redmond, WA (US)

( * ) Notice: Subject to any disclaimer, the term of this patent is extended or adjusted under 35 U.S.C. 154(b) by 986 days.

(21) Appl. No.: 12/031,717

(22) Filed: Feb. 15, 2008

(65) Prior Publication Data

US 2009/0208098 A1   Aug. 20, 2009

(51) Int. Cl.
*G06K 9/00* (2006.01)

(52) U.S. Cl. ........................................ 382/173; 382/284

(58) Field of Classification Search .................. 382/164, 382/173, 284, 294, 298, 304, 307; 345/629, 345/635, 650
See application file for complete search history.

(56) References Cited

U.S. PATENT DOCUMENTS

| | | | |
|---|---|---|---|
| 5,204,916 A | 4/1993 | Hamilton, Jr. et al. | |
| 5,416,856 A | 5/1995 | Jacobs et al. | |
| 5,862,262 A | 1/1999 | Jacobs et al. | |
| 6,191,800 B1 * | 2/2001 | Arenburg et al. | 345/505 |
| 6,356,668 B1 | 3/2002 | Honsinger et al. | |
| 6,735,754 B2 * | 5/2004 | Mehrotra et al. | 716/129 |
| 6,771,834 B1 | 8/2004 | Martins et al. | |
| 6,782,126 B2 | 8/2004 | Rao et al. | |
| 6,943,809 B2 * | 9/2005 | Dermer | 345/621 |
| 6,947,590 B2 | 9/2005 | Magarey et al. | |
| 6,956,667 B2 | 10/2005 | Delhoune et al. | |
| 7,127,104 B2 * | 10/2006 | Prasad et al. | 382/164 |
| 7,162,055 B2 | 1/2007 | Gu et al. | |
| 2006/0251324 A1 | 11/2006 | Bachmann et al. | |

OTHER PUBLICATIONS

Chen et al, "Image seaming for segmentation on parallel architecture", IEEE Transactions on Pattern Analysis and Machine Intellegence, vol. 12, No. 6, Jun. 1990, pp. 588-594.

Manjunath et al, "Browsing large satellite and aerial photographs", Department of Electrical and Computer Engineering, University of California, Santa Barbara, IEEE, 1996, pp. 765-768.

Tadikonda et al, "Region merging in medical image segmentation and interpretation", Department of Electrical and Computer Engineering, The University of Iowa, IEEE, 1993, pp. 158-159.

* cited by examiner

*Primary Examiner* — Kanjibhai Patel
(74) *Attorney, Agent, or Firm* — Gonzalez, Saggio & Harlan LLP

(57) ABSTRACT

Described is a technology by which a large image is processed into a seamless, radiometric mean image containing meaningful image objects. A large source image is tiled into non-overlapping tiles, which are each segmented into regions and merged via their regions. Source image pixels are separated into tiles comprising rows and columns. Once tiled, the tiles are segmented into regions, with each region having an identifier and other associated information such as size data, boundary data and neighbor data. The tiles are merged by merging columns or rows of tiles into row blocks or column blocks, respectively. The row blocks or column blocks are vertically or horizontally merged, respectively. Merging may proceed by selecting a pair of regions based on merging cost, merging that pair, updating its associated data and data of neighbor regions based on the merge, and repeating for other pairs until merging stop criteria are met.

20 Claims, 12 Drawing Sheets

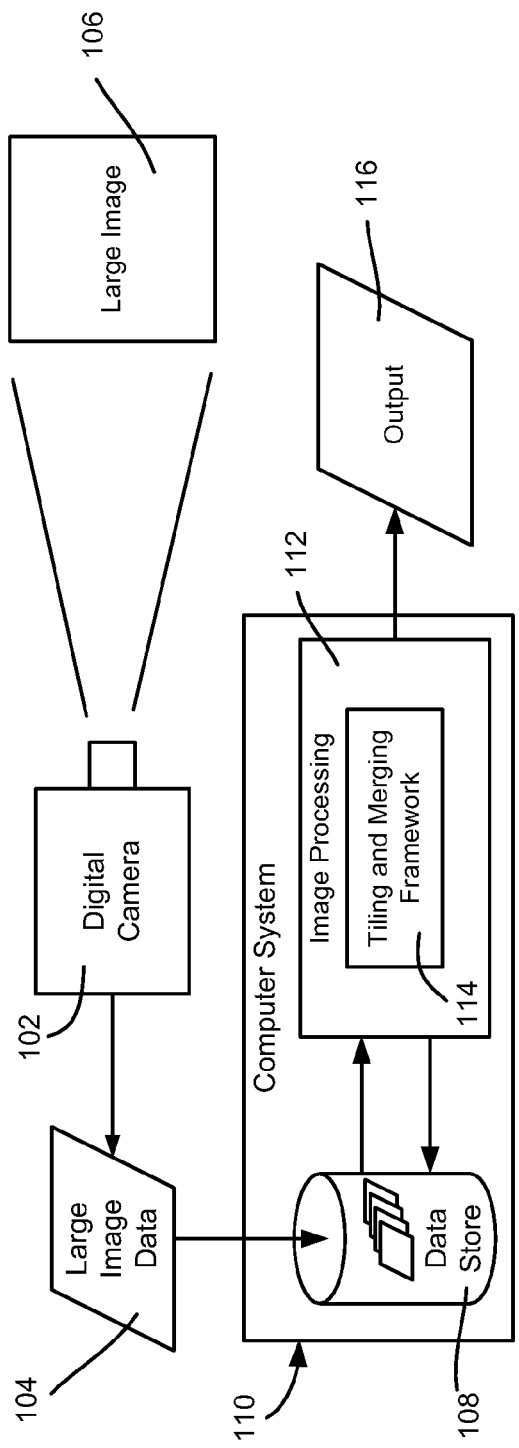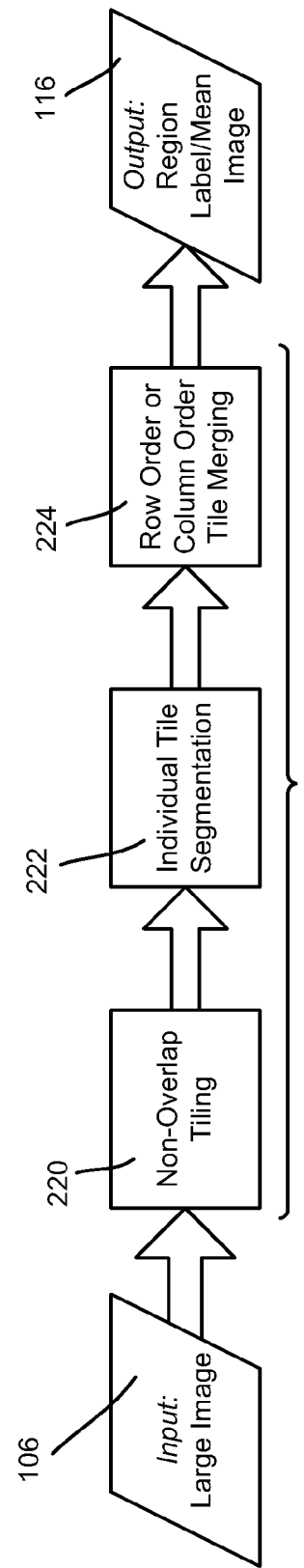

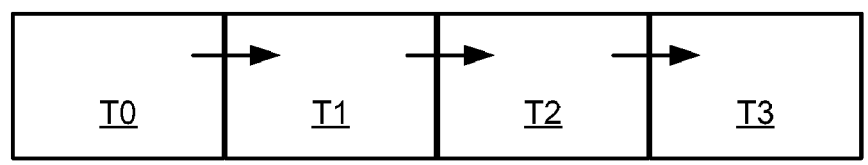
FIG. 8
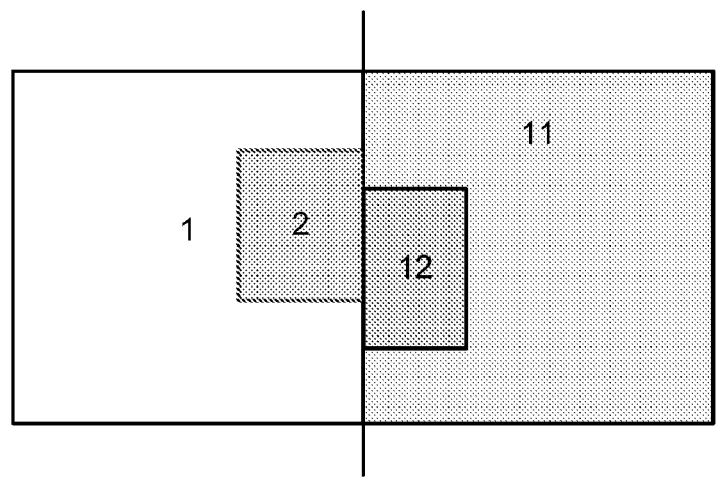
FIG. 9
FIG. 11

TILING AND MERGING FRAMEWORK FOR SEGMENTING LARGE IMAGES

BACKGROUND

Segmentation refers to a computer process that partitions a digital image into multiple sets of pixels, each set referred to as a region. The result of image segmentation is a set of regions that together cover the entire image and/or other data extracted from the image.

In general, segmentation may be used to locate objects and boundaries within an image. More particularly, image segmentation is used in object-based image analysis, which partitions remotely sensed imagery into meaningful image objects. In contrast to traditional pixel-based image analysis, an object-based approach provides additional spatial, spectral, and contextual features (such as shape, size, textural, and context relations) to facilitate more powerful image analysis.

However, segmenting a large multi-spectral image (e.g., on the order of tens to hundreds of megapixels) is a difficult task, as taking an entire large image as a single processing unit is neither practical nor feasible. This is primarily because of computational costs and memory resource constraints.

As a result, tiling and merging procedures are used as one solution to the large image segmentation problem. For example, one approach divides a large image into smaller overlapping tiles and then handles ambiguities in the overlapping areas. However, with this approach it is difficult to determine a good overlapping ratio; a large overlap reduces artifacts but significantly increases computational time. Further, the segmentation of each individual tile is not parallelized, and there is no guarantee that artificial boundaries will be removed.

Another approach generally referred to as "region assignment swapping" has been used in Recursive Hierarchical Segmentation (RHSEG), which addresses the processing window artifacts problem when segmenting a large image. The region assignment swapping approach attempts to identify pairs of regions that contain pixels that are actually more similar to other regions in the pair, and then reassigns the pixels in one region to the other region. However, this approach tends to introduce spatially non-connected regions, whereby connected component region labeling needs to be run on the resulting region labeling to restore the spatial connectivity of the regions. This increases the processing time substantially. Moreover, RHSEG is generally not directed towards segmenting large images, but rather on exploiting the image content from a segmentation hierarchy.

To classify objects in an image, such as buildings, trees, grass, and water bodies, pixel-based image classification is used. However, with current technology, the results are unsatisfactory in a number of aspects, including with respect to fuzzy edges, a general difficulty in integrating object-specific information such as shape, height and size, general inflexibility with respect to post processing, and difficulties in applying human knowledge for use in the classification.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a source image (e.g., large image) is processed into objects, including by tiling the image into non-overlapping tiles, segmenting the tiles into regions, and merging the tiles, including by merging the regions of each tile. In one example, pixels of the source image are separated into tiles comprising rows and columns based on a tile size parameter. Once tiled, the tiles are segmented into regions, (e.g., initially one region per pixel) with each region having an identifier and other associated information such as region size data, region boundary data and region neighbor data persisted for that region.

The tiles are merged by horizontally merging columns of tiles into row blocks, and vertically merging the row blocks, or alternatively by vertically merging rows of tiles into column blocks, and horizontally merging the column blocks. In one example implementation, merging proceeds by determining a set of pairs of candidate regions, determining a pair of regions in the set having a minimum merging cost, and merging the pair of regions having the minimum merging cost into a merged region. Once merged, the merged region is updated based on neighbor region relationships (e.g., to reflect changes resulting from the merging), and neighbor regions are merged.

The tiling, segmenting and merging operations may be used to provide in a seamless, radiometric mean image containing meaningful image objects.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 1 is a block diagram representing an example computing environment for processing large images via a tiling and merging framework.

FIG. 2 is a representation of various stages performed by an example tiling and merging framework.

FIG. 8 is an example representation of horizontal merging of columns into a single row block.

FIG. 9 is an example representation of a set of regions including adjacent columns to be merged.

FIG. 11 is an example representation of regions to be merged, including regions having holes.

DETAILED DESCRIPTION

Figure 3:
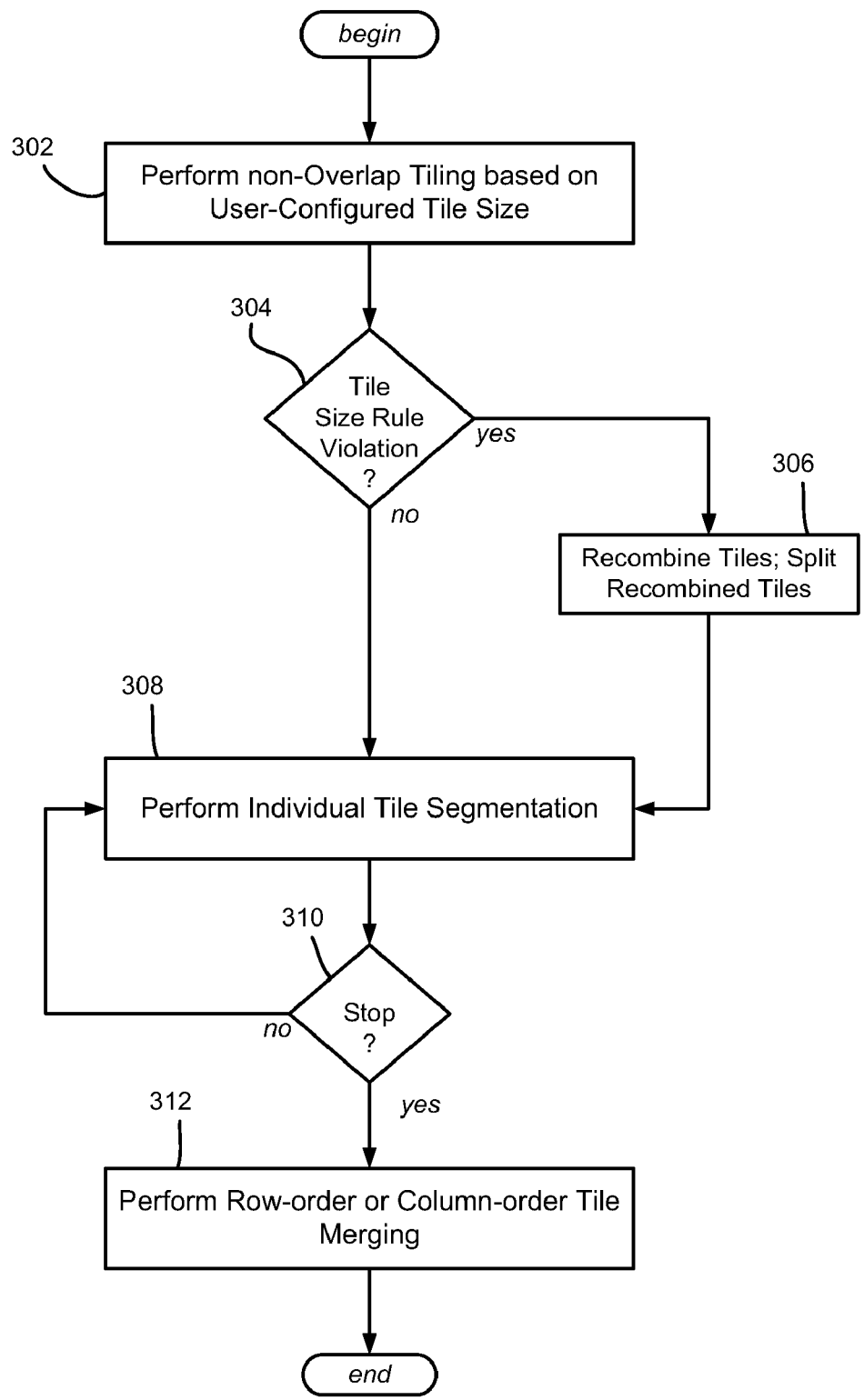
FIG. 3 is a flow diagram representing example steps taken by an example tiling and merging framework.

Various aspects of the technology described herein are generally directed towards tiling and merging operations that provide a practical, feasible way for segmenting large images into excellent segmentation results, without requiring relatively powerful computing resources. In general, a non-overlapping tiling strategy for image segmentation is described, along with a region naming translation mechanism between tiles, a merging cost criteria estimation for merging tiles, and maintaining region geometry and neighboring region relationships during tile merging.

While various examples herein are primarily described with respect to a tiling and merging framework for segmenting large images, including various example algorithms used at various stages, other mechanisms (e.g., alternative algorithms and stages) may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and image processing in general.

In general, an image segmentation-based approach as described herein creates semantic, recognizable objects with rich attributes such as size, shape, texture measurement, and contextual information, thereby improving classification results. To this end, as described herein, a large image is divided into smaller, non-overlapping tiles which are then merged together into a seamless segmented image. The merging is based on merge costs of the tiles and spatial adjacency information of neighboring tiles. As will be readily appreciated, the framework described herein eliminates certain limitations of prior approaches, including by facilitating paralleling processing and by efficiently handling very large imagery with very high-quality results.

Turing to FIG. 1, there is shown a general architecture configured to perform tiling and merging segmentation using the technology generally described herein. In general, a digital camera 102 generates large image data 104 (e.g., representing the image pixels) of a large image 106. The large image data 106 is then stored, such as copied to a data store 108 of a computer system 110.

Thereafter, image processing logic 112 (e.g., shown in the same computer system 110 as the data store 108 but possibly in a different computer system) inputs the copy of the large image data 106 from the data store 108, and, using a tiling and merging framework 114 described herein, generates output 116 corresponding to the large image data. For example, the output 116 may be a region mean image (the mean pixel values of each region), a region label image (the pixel values being region IDs), and a file (e.g., binary) storing each region's area, perimeter, and neighboring relationship information.

As generally represented in FIG. 2, the tiling and merging segmentation framework 114 processes the large image data 106. In one example implementation, the tiling and merging segmentation framework 114 includes three processing stages, namely a non-overlap tiling stage 220, an individual tile segmentation stage 222, and a row-order or column-order tile merging stage 224.

As generally represented in FIG. 3 by step 302, the non-overlap tiling stage 220 is performed first. In general, tiling breaks a large image into smaller pieces. In one example implementation described herein, given a desired tile size, the large image 106 is first strictly divided into as many tiles as possible.

In an example implementation, the non-overlap tiling stage 220 is controlled by a user-configurable parameter, referred to as tile size, that is provided by the user of the image processing logic 112 and serves as a suggested tile block size for segmentation. For example, a tile size parameter value of 256 indicates each tile will be a 256×256 square block, if possible. Note that it is possible that some tiles may be smaller than the specified tile size, because an arbitrary input image size may not be evenly divisible by the input tile size.

As generally represented in FIG. 3 via steps 304 and 306 and as described below, a tiling rule may be imposed to avoid having tiles that are too small, as such small tiles tend to create more artificial objects during segmentation. For example, one such tiling rule specifies that any tile has to be greater than or equal to one-half the size of the specified tile dimension; if not, such tiles are recombined with adjacent tiles, and then re-split (e.g., into two halves) so that the rule is not violated.

More particularly, after initial tiling, the last tile size in each row and column is checked to see whether a tile is too small in either its height or width dimension, or both. If so, a tile dimension adjustment is performed as necessary on the row or column direction, or both. Thus, for example, if the last tiles' sizes in the column direction have a dimension larger than half of the input tile size, that column of tiles is used as is, that is, nothing changes. However, if a dimension in the column direction is smaller than some rule-specified fractional amount (e.g., one-half) of the specified tile size, the last two columns tiles are combined together and then split, (e.g., in half of the combined width); row recombining and splitting operates in the same way.

Figure 4:
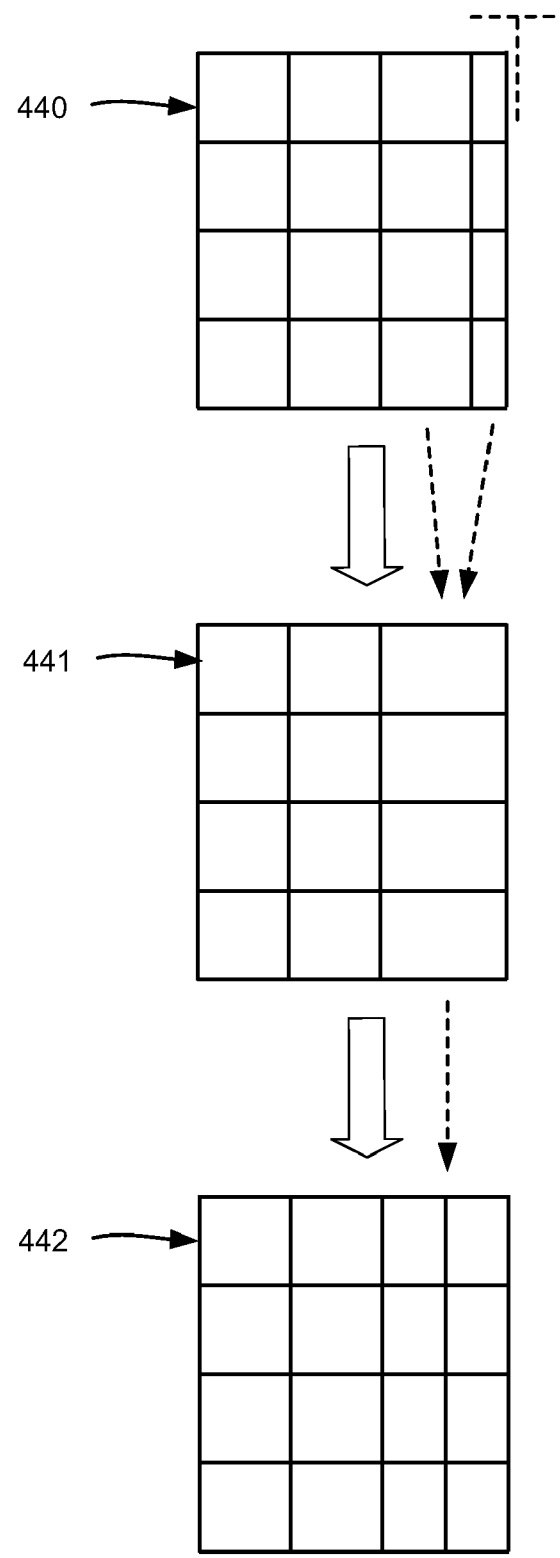
FIG. 4 is an example representation of non-overlapping tiling in which a column is recombined with another column with the resulting column split to achieve a minimum width.

FIG. 4 shows an example of how tiles may be recombined and then split; note that while FIG. 4 illustrates recombining two columns and splitting the resulting combined column, the procedure for a row is the same, (although there is no requirement that the same fractional threshold be used for a row minimum that is used for a column minimum). As shown in FIG. 4 using one-half as the fractional threshold, it is seen that in the initial strictly-divided state 440, the rightmost column is less than one-half of the width of the other columns (one-half the width corresponds to the dashed vertical line) which was set according to the desired block size parameter value.

Thus, the last two columns are recombined into a single column, as shown in the recombined state 441. The combined column, which now exceeds the desired width, is split in half, as shown in the split state 442. These two columns are equal (at least to within a pixel difference if an odd number width is split), and although less than the desired width, each column is now greater than or equal to half of the desired width.

Returning to FIGS. 2 and 3, after such non-overlapping tiling, image segmentation is individually performed on each tile (step 308) in the individual tile segmentation stage 222. It is noted that the segmentation processing of multiple tiles may be performed in parallel, as the tiles are independent of one another. In one example implementation, there are two input parameters and one output parameter for each tile being processed, namely a maximum merging cost input parameter and a minimum number of output objects input parameter (the inputs), and an actual output number of objects output parameter (the output). For each tile, the output regions may be labeled from zero to the number of output regions minus one. As described below, the tile merging process can be performed in either row-order or column-order.

One segmentation algorithm comprises a Full Lambda Schedule Algorithm region criteria as shown below:

$$tij = \frac{\frac{|Oi||Oj|}{|Oi|+|Oj|}\|ui-uj\|^2}{l(\partial(Oi, Oj))}$$

where tij is the merging cost of merging regions $O_i$ and $O_j$, $l(\partial(Oi,Oj))$ is the common boundary of region $O_i$ and $O_j$; $|Oi|$ and $|Oj|$ are the areas of region $O_i$ and $O_j$. The values ui and uj are the region mean intensity values for each region. Note that while this Full Lambda Schedule Algorithm segmentation algorithm used in one example implementation, the tiling and merging framework is applicable to any region merging-based segmentation algorithm.

With respect to preparation during individual tile segmentation, in this example, one or both of the two input parameters may be used to control the stopping criterion for the tile segmentation, namely the maximum merging cost and/or the minimum number of output regions. In this implementation, if the minimum merging cost of the potential merging pairs is greater than the specified maximum merging cost, or the current number of regions in this tile is less than or equal to the specified minimum number of output regions, then the segmentation for this tile stops, as generally represented by the "yes" branch of step 310. Note that the use of both criteria is advantageous when two neighboring tiles have significantly different radiometric characteristics.

By way of example, consider two neighboring tiles, one having quite diverse ground features such as buildings, grass, trees, and roads, with the other having only water, such as part of a lake. If only the merging cost criterion is used, then the whole second tile likely will be merged into one region. This is undesirable for the subsequent tile merging process. Using the minimum number of regions to output as a second control parameter avoids such a result.

In one example implementation, during individual tile segmentation, a data structure such as a region label image file is written out, such as to the data store 110 (FIG. 1) with each pixel value (e.g., an integer value) being the region identifier. Further, the area of each region (e.g., represented as a number of pixels) is kept for each region, along with the perimeter of each region (e.g., also represented as a number of pixels); note that sometimes a region has holes, in which event the perimeter refers to the outer polygon's perimeter. Also kept in association with each region are the region mean radiometric values for each band, which is updated whenever a merge takes place. Still further, the identifiers of a region's neighboring regions (that is, those that share edges) are maintained, as are the shared boundary lengths with those neighboring regions (e.g., each length represented as a number of pixels). Also maintained is the actual maximum merging cost of the tile, which is used to guide the setting of merging cost criteria during the merging between two tiles, and the actual number of output regions of the tile, which is used to set an offset value during tile merging.

Figure 5:
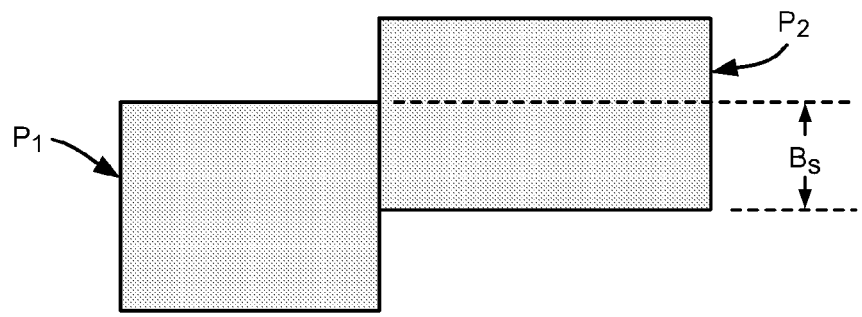
FIG. 5 is an example representation of two regions to be merged.

In an example implementation, at the start, each pixel has a perimeter of four sides and an area of one pixel. When merging two regions together, as generally represented in FIG. 5, the following equation applies consistently (including for regions with holes):

$$P=P_1+P_2-2B_s$$

where P is the perimeter of the region after merging, $P_1$ and $P_2$ are the perimeters of the regions before merging, and $B_s$ is the shared boundary between the two regions.

In this example, the region-merging process starts with an initial status of an image, i.e., each pixel is a region, and each pixel neighbors at most four other regions (pixels). Two regions need to share an edge before given the chance to merge. Note that a pixel that connects with another pixel at only one point is not considered as having a neighboring relationship, and thus does not have the chance to merge with that other pixel.

In general and as described below, the region-merging stage 224/process (FIG. 2, and step 312 of FIG. 3) proceeds by continuously searching for a region-pair that has the minimum merging cost, merging that pair, and then updating the status of other regions that were affected by this merge. The process continues until a stopping criterion is satisfied. For example, the stopping criterion may be based on the number of output regions (e.g., if the number of regions reaches this value then stop), or the maximum merging cost (e.g., if the minimum merging cost of all possible region pairs is greater than this value, then stop), or a combination of such criterion. Note that while this procedure works well for small images, breaking larger images into smaller pieces is often necessary.

Figure 6:
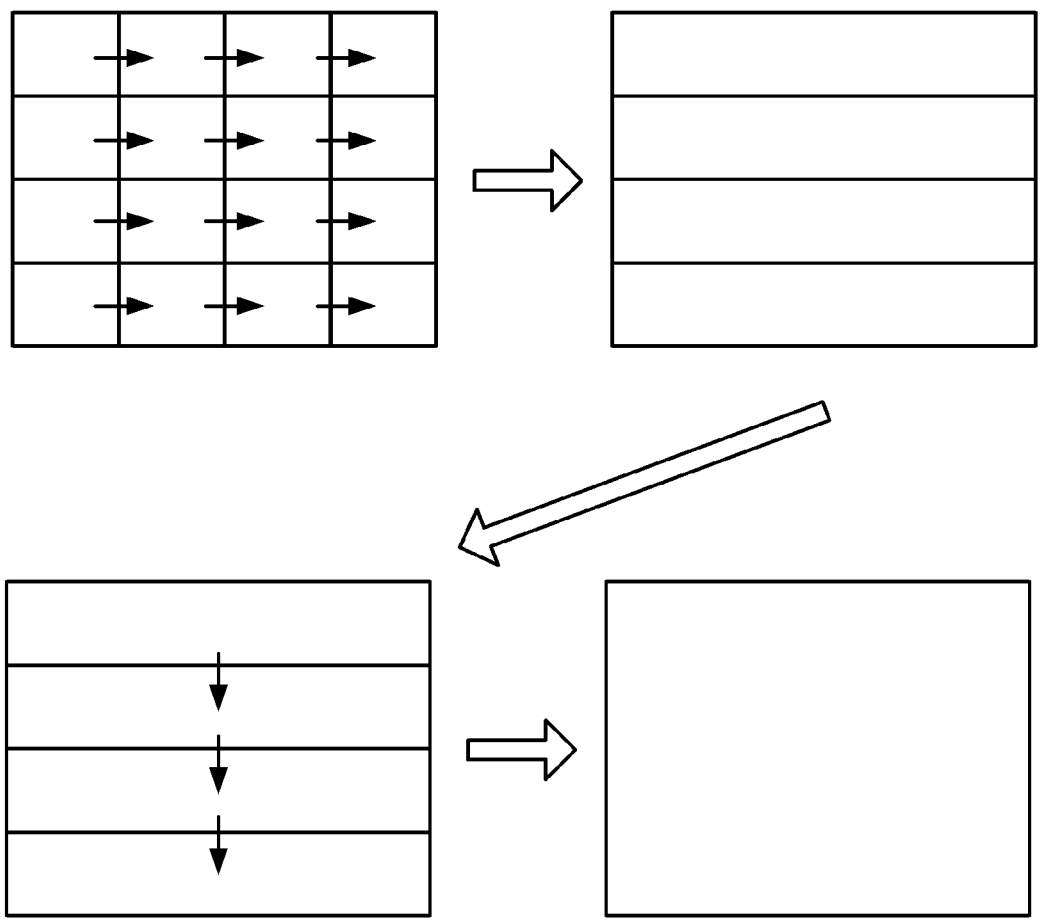
FIG. 6 is an example representation of horizontal merging of columns into row blocks followed by vertical merging of the row blocks.
Figure 7:
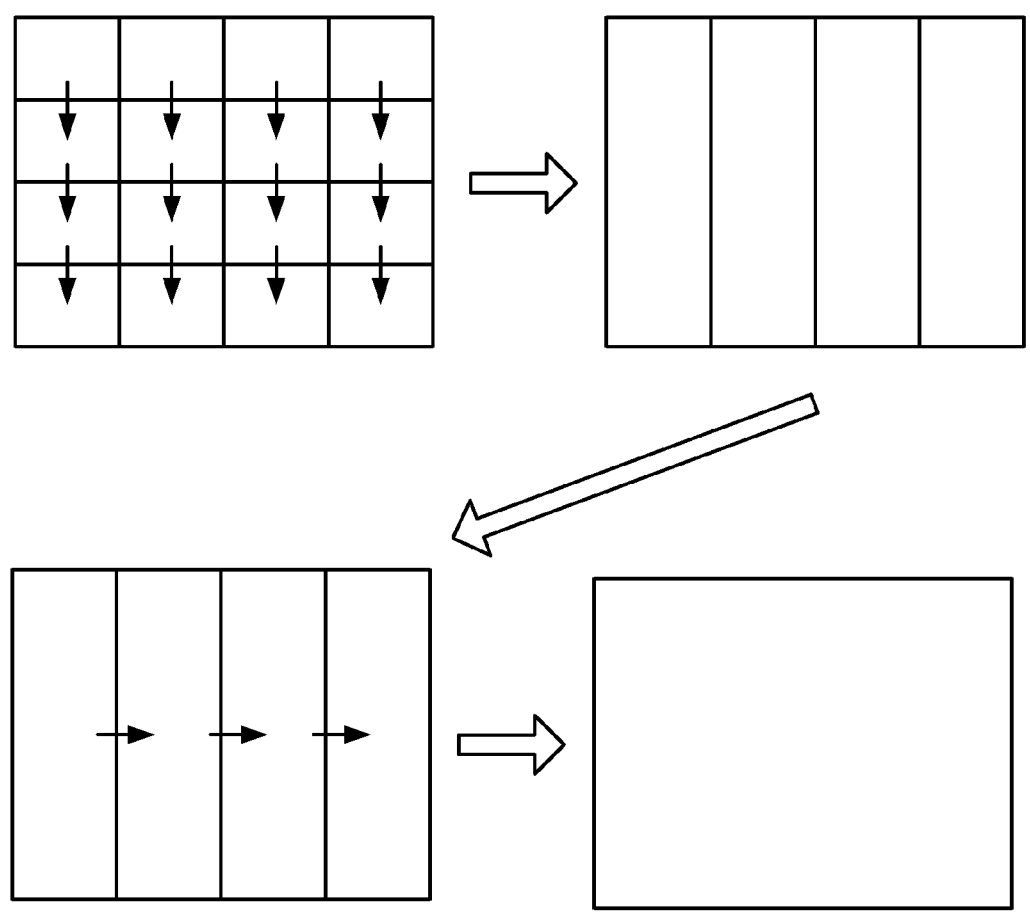
FIG. 7 is an example representation of vertical merging of rows into column blocks followed by horizontal merging of the column blocks.

When merging between tiles, tile merging may be conducted on row-order or column-order, as shown in FIGS. 6 and 7, respectively. Note that for brevity, because the algorithm for either type of merging is the same (except for the order of merging), row-order tile merging is primarily described herein.

FIG. 6 generally represents row-order tile merging, in which the tiles in each row are independently merged, followed by merging the rows incrementally. As can be seen, in this example the merging progresses from left-to-right, (which may be performed independently and thus in parallel) until only rows remain in this example. Thereafter, the remaining rows are incrementally merged, in a top-to-bottom order in this example.

FIG. 7 similarly depicts column-order tile merging, in which the tiles in each column are merged independently, followed by the incremental merging of the columns. As can be seen, in this example the merging progresses from top-to-bottom, (which may be performed independently) until only columns remain in this example. Thereafter, the remaining columns are incrementally merged, in a left-to-right order in this example.

By way of a more particular example of merging in a horizontal direction, as mentioned above, when row-order merging, horizontal merging is performed first, independently merging row by row. Then for each row, tile merging is performed incrementally within a row block. As shown in the example of FIG. 8, incremental merging first merges tile T0 with tile T1; the merged result is then merged with tile T2, and its result is again merged with tile T3. Each row outputs a region label image/region information file which contains the area, perimeter, its neighbor regions' identifiers and shared boundary lengths for each region, as described above. An example of merging tile T0 with tile T1 is described below; subsequent tile merging is performed in a similar manner.

FIG. 9 shows two tiles to merge within such a row block, comprising two 4×4 tile images 990 (unshaded) and 992 (shaded) waiting to be merged. Note that the tile 990 and the tile 992 can be processed independently and in parallel with other tile processing, and their region identifiers may be duplicated. For example, tile 990's region identifiers range from 0 to n1−1, and tile 992's region identifiers range from 0 to n2−1, where n1, and n2 are the number of output regions in each tile, respectively.

In order to maintain a unique identifier for each region after tile merging, an offset value (n1) is added to every region identifier of the second tile before performing the merge. FIG. 9 is used as an example in the following algorithm description.

In a first example step represented by step 1002 of FIG. 1A, along the last column 994 of the first tile 990 and the first column 996 of the second tile 992, region neighboring relations are collected to build possible merging pairs into a candidate merging pair list. For each pair, the following information is computed, as generally represented in step 1004:

ID1: the identifier of the first region
ID2: the identifier of the second region
Area1: the area of the first region
Area2: the area of the second region
Area: the area of the region after merge
Perimeter1: the perimeter of the first region
Perimeter2: the perimeter of the second region
Perimeter: the perimeter of the region after region
Gval1: the radiometric values of each band of the first region
Gval2: the radiometric values of each band of the second region
Gval: the radiometric values of the region after merge
MergeCost: the merging cost of the region pair
SharedBoundary: the shared boundary length of the first region and the second region Step 1006 ensures that region 1's identifier is always smaller than region 2's identifier by swapping the two regions (step 1008) if needed. Note that the following equations apply, and the merging cost can be calculated as described herein. Further note that:

Area=Area1+Area2, and

Perimeter=Perimeter1+Perimeter2−2*SharedBoundary

Corresponding to FIG. 9, the following region pairs may be established for the tiles in columns 994 and 996:

| Pair | First Region ID | Second Region ID | Shared Boundary Length |
|------|-----------------|------------------|------------------------|
| 1    | 3               | 10               | 1                      |
| 2    | 4               | 10               | 2                      |
| 3    | 5               | 12               | 1                      |

In one example implementation, the above merge list can be built efficiently through a map data structure via the example steps 1010, 1012, 1014 and 1016 of FIG. 1A. In this example, each candidate merging pair is uniquely identified (e.g., by ID1, ID2), and its shared boundary length is initialized to one (1) at step 1002. Along the last column (e.g., 994) of the first tile (e.g., 990) and the first column (e.g., 996) of the second tile (e.g., 992), the process scans every row and attempts to insert (step 1010) the pair into a merge list that is represented with a map data structure. If the insertion succeeds (step 1012), the process is continued. If the insertion failed, which means the pair already exists in the output merge list, then one (1) is added (step 1014) to the shared boundary length of that pair. Thus, in FIG. 9, the pair (4, 10) exists twice, whereby only one entry exists in the data structure having a shared boundary length of two (2).

As represented by step 1016, for each newly added merging pair, the corresponding regions' neighbor information is updated. In the example of FIG. 9, this means that regions 3 and 4 add region 10 to their neighbor list, and region 5 adds region 12 to its neighbor list. As also represented in step 1016, their shared boundary lengths are also added.

Step 1018 determines the merging cost criteria for merging the two tiles, and step 1020 repeats the general process for each candidate merging pair. Because the maximum merging cost for each individual tile is known, the following formula may be used to compute the maximum merging cost for the tile merging:

Maximum Merging Cost=Mean Merging Cost+ α*Standard Deviation where Mean Merging Cost and Standard Deviation may be calculated from each individual tile's maximum merging cost, and α is a user tunable parameter that controls the degree of tile merging. A zero α value specifies the use of Mean Merging Cost as the stopping criterion for the tile merge. Note that the larger the α value, the greater the number of merges that may occur, and the more smooth the look and feel of the region will be. However, too large of an α value may cause diverse ground features to be put into one region, leading to an undesirable situation referred to as 'under segment'. Note that there are alternative ways for selecting a maximum merging cost threshold to use. For example, let MC1 be the maximum merge cost of tile1, and MC2 be the maximum merge cost of tile2; when merging tile1 and tile2, the maximum merging cost for merging tile1 and tile2 can be set to the minimum of MC1 and MC2, or the maximum of the MC1 and MC2, or computed by taking the area of tile1 and tile2 into account, such as (Area1*MC1+Area2*MC2)/(Area1+Area2), where Area1 and Area2 are the area or the total number of pixels for tile1 and tile2.

Figure 10A:
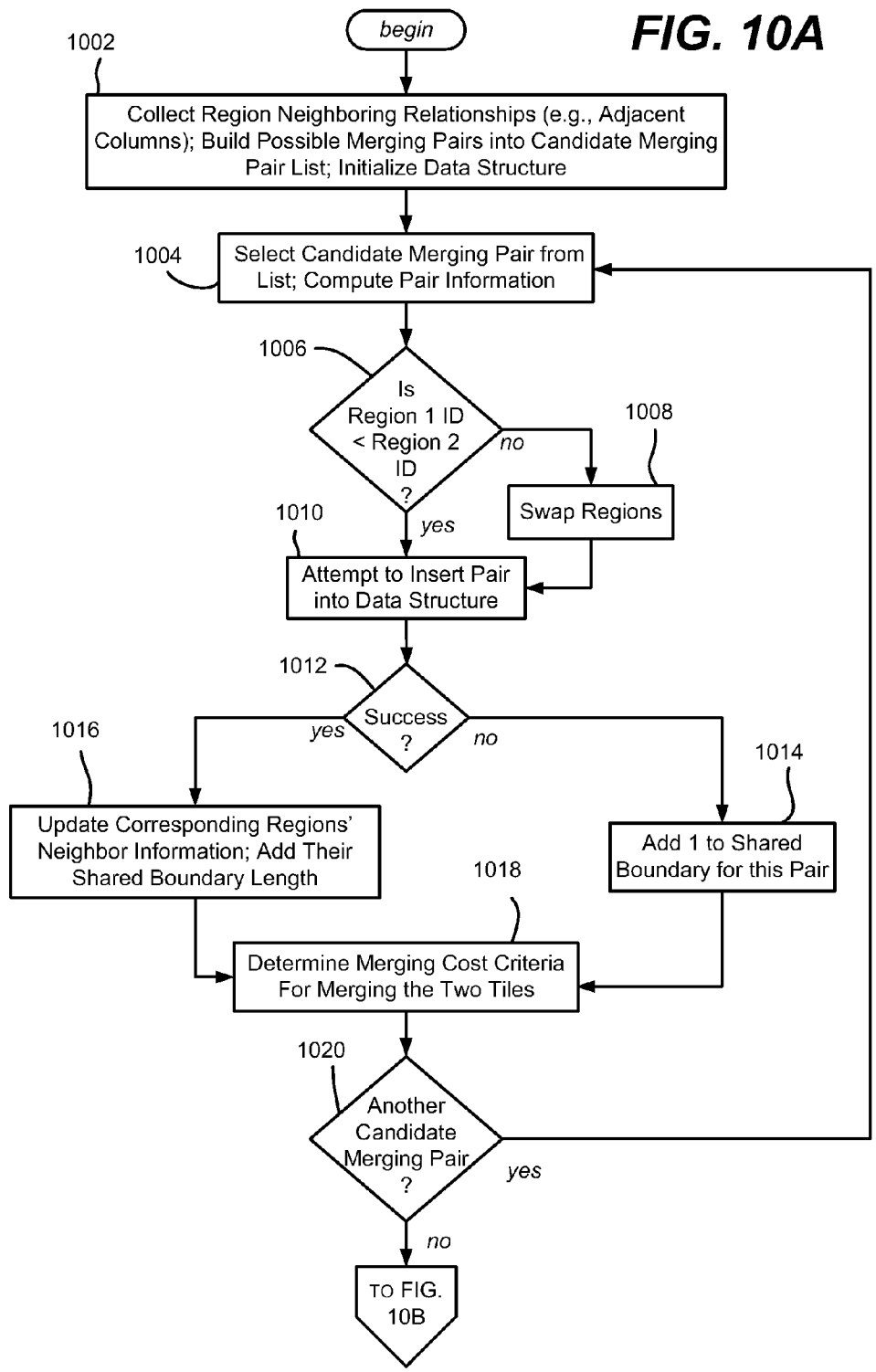
FIGS. 10A and 10B comprise a flow diagram including example steps for performing horizontal merging.
Figure 10B:
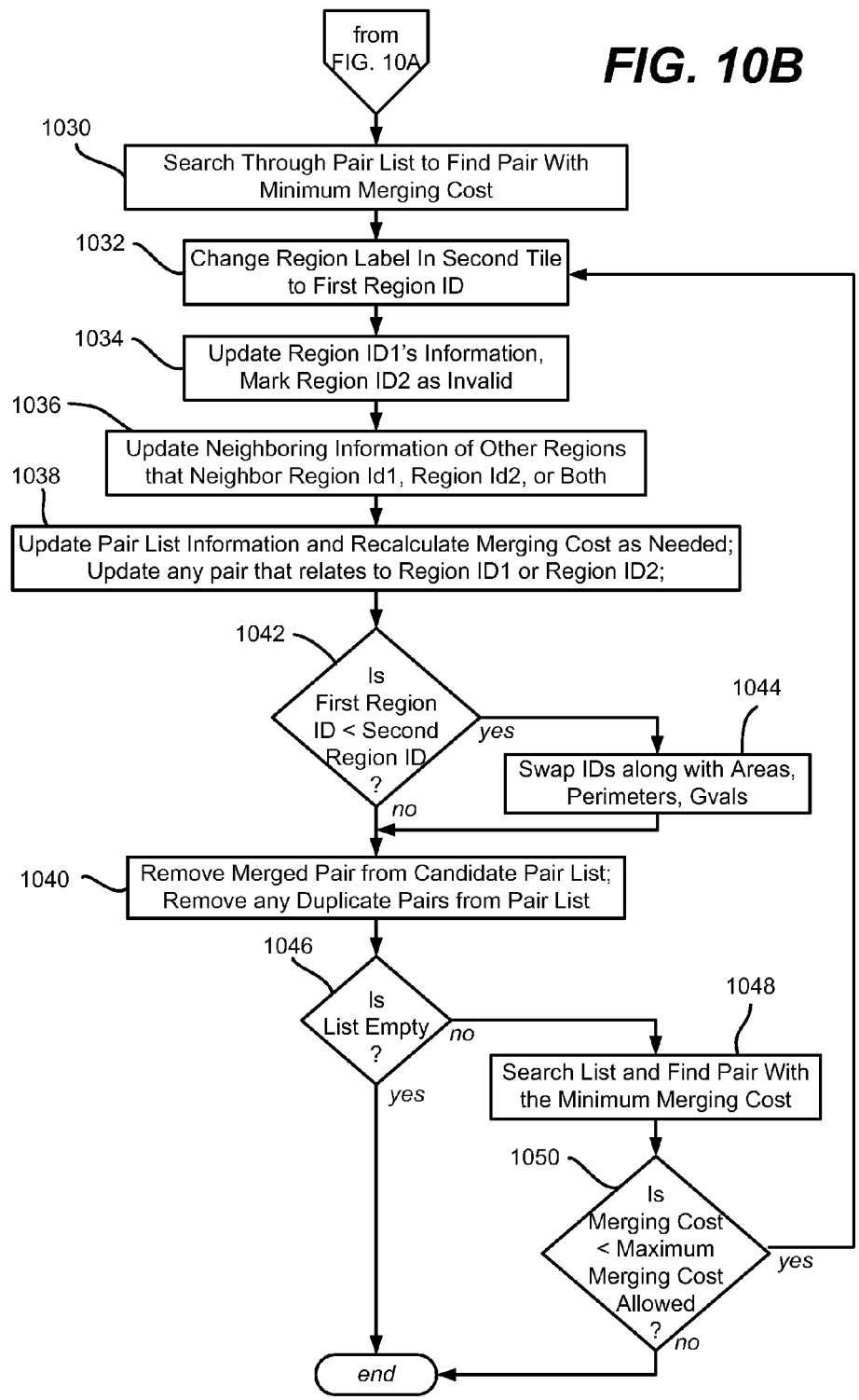

Step 1030 of FIG. 10B represents searching through the pair list built via FIG. 10A to find the pair in the list that has the minimum merging cost, and starting to merge. In the following example, consider that in FIG. 9 and the above table listing the pairs, the pair 2 (4, 10) had the minimum merging cost, whereby the remaining example steps of FIG. 10B are performed for this pair.

At step 1032, the region label in the second tile is changed to the first region ID, e.g., using a flood fill method. In the example of FIG. 9 this changes the pixels that are labeled 10 to now be labeled 4.

Step 1034 updates ID1's region information, and marks region ID2 as invalid (e.g., by setting it to −1). The area and perimeter of the new merged region may be taken directly from the merging pair.

Step 1036 represents updating the neighboring information of the other regions that neighbor region ID1, or region ID2, or both. In FIG. 9, as a result of the merging of region 10 and region 4, the shared boundary length between region 3 and 4 changes from one (1) to two (2). Regions 11, 12, and 13 change to neighbor with region 4, instead of region 10.

Step 1038 updates the pair list information and recalculates the merging cost, if needed. Also, any pair that relates region ID1 or region ID2 needs to be updated. For example, the pair 1 (3, 10) needs to change to (3, 4), and its pair information including its merge cost needs to be recalculated. Pair 3 (5, 12) does not need to change as neither region 5 nor region 12 neighbors with region 4 or region 10. Steps 1042 and 1044 ensure that during updating, ID1 is always smaller than ID2, by swapping them if this is not the case, along with swapping area1 and area2, perimeter1 and perimeter2 and gval1 and gval2.

Step 1040 represents removing the merged pair from the candidate pair list, and also removing any duplicate pairs from the pair list. Note that duplicate pairs may occur in the case of merging the regions with holes.

By way of example, FIG. 11 shows such an example of creating duplicate entries in the candidate merge list. In FIG. 11, the initial pairs qualified to merge are represented by (ID1, ID11), (ID1, ID12), (ID2, ID11), and (ID2, ID12). After merging pair (ID2, ID12), the remaining pairs are (ID1, ID11), (ID1, ID2), and (ID2, ID11); note that the second region ID12 in the pair (ID1, ID12) is changed to ID2, as essentially the region of ID12 no longer exists after merging. Then after merging the pair (ID1, ID11), the remaining pairs are (ID1, ID2) and (ID2, ID1), which become (ID1, ID2) after swapping the region identifiers to enforce that the first region identifier is smaller than the second region identifier. Thus two pairs of (ID1, ID2) exist, whereby such a duplicate pairing is removed at step 1040.

Returning to FIG. 10B, step 1042 evaluates whether the pair list is empty. If not, step 1048 searches the list to find the pair with the minimum merging cost. If at step 1050 the merging cost is less than the maximum merging cost allowed, the process is re-run to merge this pair. If the pair list is empty (step 1048) or if the minimum merging cost of the pair list is greater than the merging criteria (step 1050), the process stops to finish the merging of the two tiles.

The above example steps may be run for each row block independently, and thus each row block may be processed in parallel. The horizontal merging is complete after the row block merging is finished.

Figures 12, 13:
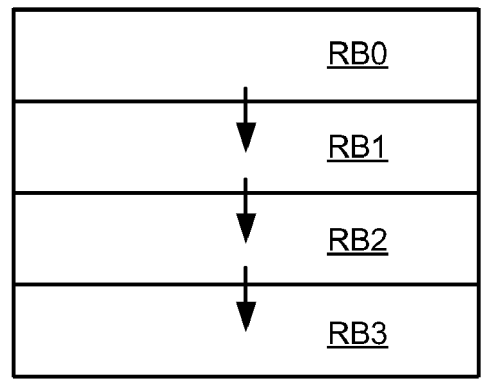
FIG. 12 is an example representation of vertical merging of row blocks.
FIG. 13 is an example representation of a set of regions including adjacent row blocks to be merged.
Figure 14:
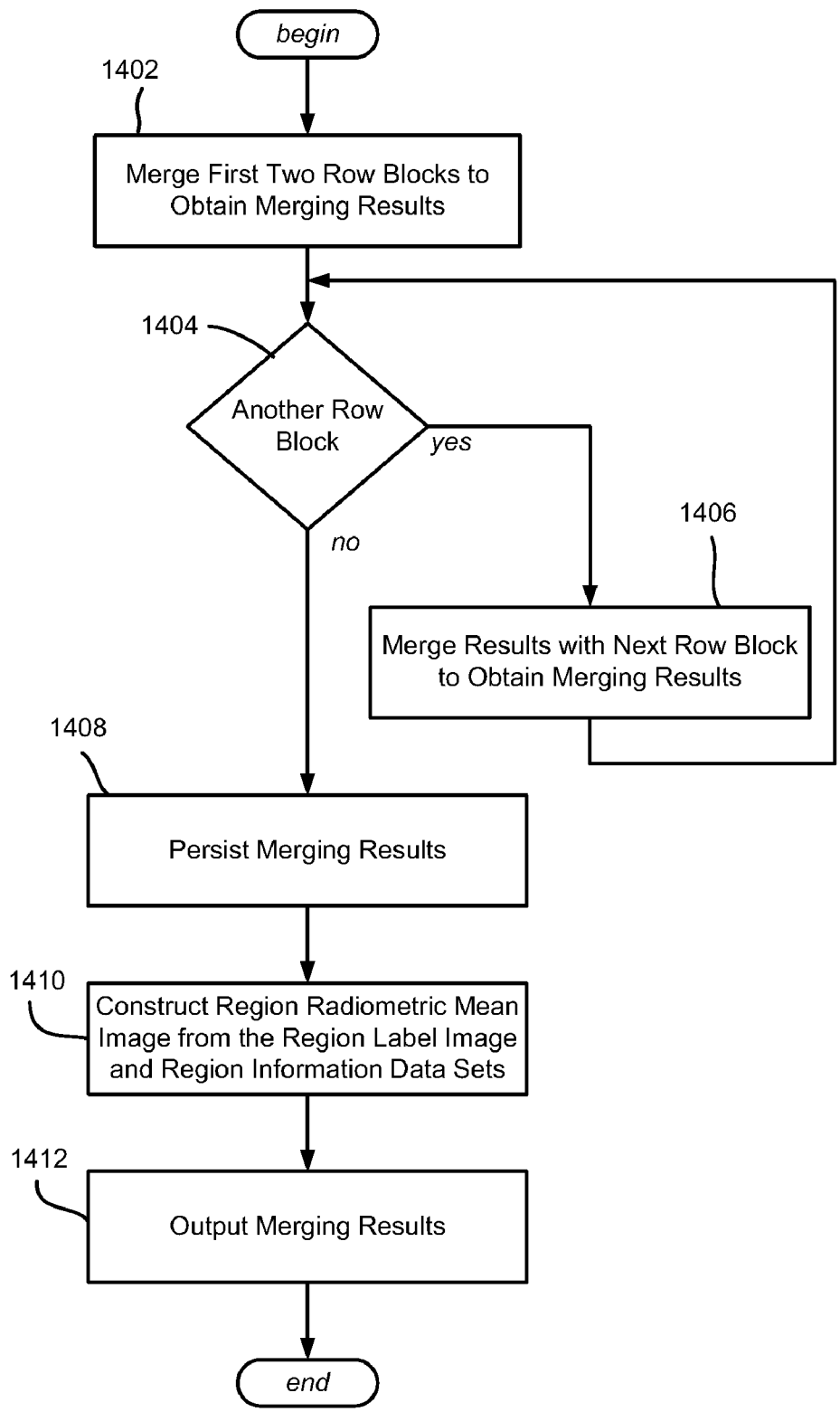
FIG. 14 is a flow diagram representing example steps for serially merging row blocks.

Turning to FIGS. 12-14, with respect to merging in the vertical direction, after each row block is merged, a vertical merging process (FIG. 14) starts to merge among row blocks, along the vertical direction as shown in FIG. 12. In this example, the topmost row block (e.g., labeled row block RB0) is first merged with the next lower row block (e.g., RB1), as represented in FIG. 14 via step 1402.

As represented in FIG. 13, with respect to the collection of a candidate merging pair list along two row blocks 1330 (unshaded) and 1332 (shaded), the last image line 1334 of the first row block 1330 and the first line 1336 of the second row block 1332 provide the candidate merging pair list. For example, in FIG. 13, the following pairs and their corresponding shared boundary length are collected into a candidate merging pair list; note that similar to the case of merging two tiles during horizontal merge, an offset value, i.e., the number of output regions of the first row block, is added to every region ID in the second row block so that the uniqueness of every region ID is maintained:

| Pair | First Region ID | Second Region ID | Shared Boundary Length |
|---|---|---|---|
| 1 | 0 | 21 | 2 |
| 2 | 2 | 24 | 1 |
| 3 | 10 | 24 | 1 |
| 4 | 10 | 31 | 3 |
| 5 | 13 | 32 | 1 |

The vertical merging procedure is similar to the procedure for merging in horizontal direction described above; however, because subsequent merges use the results of previous merges, the procedure is carried out sequentially (e.g., as in FIG. 14) and thus vertical merging is not processed in parallel. Note that this does not significantly hurt performance, as the individual tile segmentation and horizontal merging take most of the computational time.

The maximum merging cost of each row block can be computed via the same equation used in horizontal merging, (where Mean Merging Cost and Standard Deviation is calculated from the actual merging costs of the tiles in that row). During merging between row blocks, the merging cost criterion can be calculated in the same way, where a may be set to the same value or a different value from that used in the horizontal merging, e.g., as determined empirically for different domain applications and image types.

Returning to FIG. 14, if another row block exists (step 1404), the result of the previous merge is then merged with the next lower row block at step 1406 (e.g., RB2). In the example of FIG. 12, another row block exists, and thus the previous merging result is merged with the next last row block (e.g., RB3, which is the last row block in this example). When no more row blocks exist to be merged, the final merging results are persisted in some way at step 1048, e.g., saved to non-volatile storage.

In one example implementation, before the vertical merging, each row block has a binary file that contains the regions' information such as region label, area, perimeter, neighboring region IDs and share boundary lengths. Note that in horizontal merging, for each row block this file gets larger as more tiles are merged within that row. During vertical merging, however, each row block can keep its own region information file, which means two row blocks need not be concatenated together. Instead, when two regions are merged together, duplicate region information is kept in two places (e.g., files). This way only two row blocks' region information needs to be kept in memory at a time. While such an arrangement may not be necessary for relatively small images, it may be helpful in reducing the amount of memory that needs to be used for very large images. Note, however, that during the process of searching and updating a region's neighboring information, multiple files may need to be opened and closed.

By way of example, consider an image in which a river runs from the top of the image to the bottom of the image and across multiple row blocks. As can be readily appreciated, a number of file openings and closings are performed in such a scenario. Notwithstanding, because the number of merges during vertical merging is ordinarily much smaller than that during individual tile segmentation, the processing time is not significantly affected. Also, the searching/updating time can be reduced if searching/updating is conducted on the nearer row block first; it only looks for farther row blocks if region information is not found in the closer row blocks.

Figure 15:
FIG. 15 is a representation of an example image resulting from tiling, segmentation and merging operations.

After the vertical merging procedure, (or horizontal merging procedure if column blocks were last merged) a seamless region radiometric mean image containing meaningful image objects may be reconstructed and output (as generally represented by steps 1410 and 1412 of FIG. 14) from the region label image and region information data sets that have been created during the tile merging process described above. By way of example, FIG. 15 shows a screen capture (in grayscale) of a sample merging result. The screen capture covers only the portion of the segmentation image that centers on the area at which four non-overlap tiles intersect. As can be seen, no artificial boundary is recognizable; the tiling and merging for segmenting large images described herein is effective and creates good results, while being intuitive, allowing for parallel processing during individual tile segmentation, and facilitating the use of tunable parameters.

Exemplary Operating Environment

Figure 16:
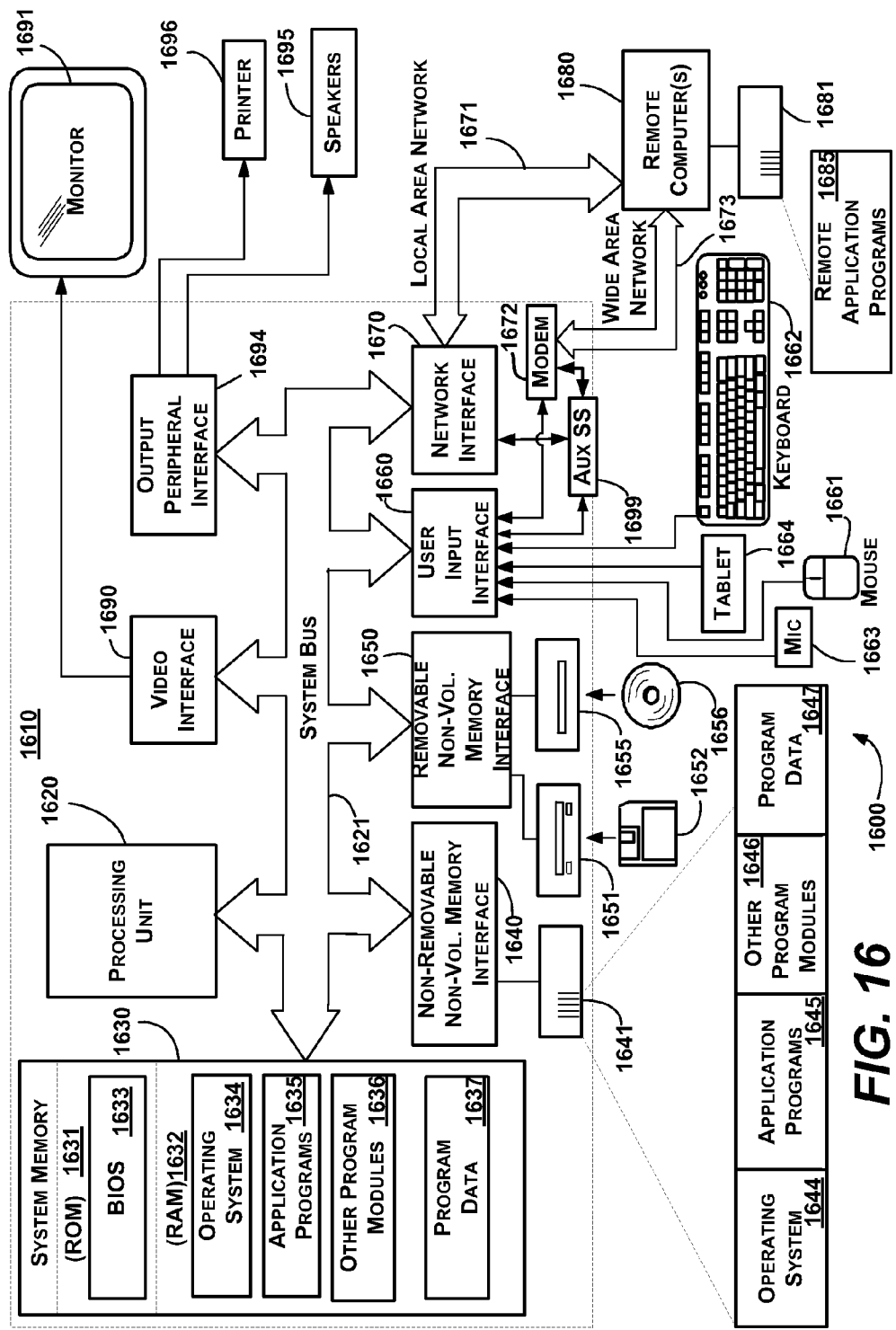
FIG. 16 shows an illustrative example of a computing environment into which various aspects of the present invention may be incorporated.

FIG. 16 illustrates an example of a suitable computing system environment 1600 in which various examples of FIGS. 1-15) may be implemented. The computing system environment 1600 is only one example of a suitable computing environment and is not intended to suggest any limitation as to the scope of use or functionality of the invention. Neither should the computing environment 1600 be interpreted as having any dependency or requirement relating to any one or combination of components illustrated in the exemplary operating environment 1600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 16, an exemplary system for implementing various aspects of the invention may include a general purpose computing device in the form of a computer 1610. Components of the computer 1610 may include, but are not limited to, a processing unit 1620, a system memory 1630, and a system bus 1621 that couples various system components including the system memory to the processing unit 1620. The system bus 1621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1610 typically includes a variety of computer-readable media. Computer-readable media can be any available media that can be accessed by the computer 1610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 1630 includes computer storage media in the form of volatile and/or nonvolatile memory such as read only memory (ROM) 1631 and random access memory (RAM) 1632. A basic input/output system 1633 (BIOS), containing the basic routines that help to transfer information between elements within computer 1610, such as during start-up, is typically stored in ROM 1631. RAM 1632 typically contains data and/or program modules that are immediately accessible to and/or presently being operated on by processing unit 1620. By way of example, and not limitation, FIG. 16 illustrates operating system 1634, application programs 1635, other program modules 1636 and program data 1637.

The computer 1610 may also include other removable/non-removable, volatile/nonvolatile computer storage media. By way of example only, FIG. 16 illustrates a hard disk drive 1641 that reads from or writes to non-removable, nonvolatile magnetic media, a magnetic disk drive 1651 that reads from or writes to a removable, nonvolatile magnetic disk 1652, and an optical disk drive 1655 that reads from or writes to a removable, nonvolatile optical disk 1656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1641 is typically connected to the system bus 1621 through a non-removable memory interface such as interface 1640, and magnetic disk drive 1651 and optical disk drive 1655 are typically connected to the system bus 1621 by a removable memory interface, such as interface 1650.

The drives and their associated computer storage media, described above and illustrated in FIG. 16, provide storage of computer-readable instructions, data structures, program modules and other data for the computer 1610. In FIG. 16, for example, hard disk drive 1641 is illustrated as storing operating system 1644, application programs 1645, other program modules 1646 and program data 1647. Note that these components can either be the same as or different from operating system 1634, application programs 1635, other program modules 1636, and program data 1637. Operating system 1644, application programs 1645, other program modules 1646, and program data 1647 are given different numbers herein to illustrate that, at a minimum, they are different copies. A user may enter commands and information into the computer 1610 through input devices such as a tablet, or electronic digitizer, 1664, a microphone 1663, a keyboard 1662 and pointing device 1661, commonly referred to as mouse, trackball or touch pad. Other input devices not shown in FIG. 16 may include a joystick, game pad, satellite dish, scanner, or the like. These and other input devices are often connected to the processing unit 1620 through a user input interface 1660 that is coupled to the system bus, but may be connected by other interface and bus structures, such as a parallel port, game port or a universal serial bus (USB). A monitor 1691 or other type of display device is also connected to the system bus 1621 via an interface, such as a video interface 1690. The monitor 1691 may also be integrated with a touch-screen panel or the like. Note that the monitor and/or touch screen panel can be physically coupled to a housing in which the computing device 1610 is incorporated, such as in a tablet-type personal computer. In addition, computers such as the computing device 1610 may also include other peripheral output devices such as speakers 1695 and printer 1696, which may be connected through an output peripheral interface 1694 or the like.

The computer 1610 may operate in a networked environment using logical connections to one or more remote computers, such as a remote computer 1680. The remote computer 1680 may be a personal computer, a server, a router, a network PC, a peer device or other common network node, and typically includes many or all of the elements described above relative to the computer 1610, although only a memory storage device 1681 has been illustrated in FIG. 16. The logical connections depicted in FIG. 16 include one or more local area networks (LAN) 1671 and one or more wide area networks (WAN) 1673, but may also include other networks. Such networking environments are commonplace in offices, enterprise-wide computer networks, intranets and the Internet.

When used in a LAN networking environment, the computer 1610 is connected to the LAN 1671 through a network interface or adapter 1670. When used in a WAN networking environment, the computer 1610 typically includes a modem 1672 or other means for establishing communications over the WAN 1673, such as the Internet. The modem 1672, which may be internal or external, may be connected to the system bus 1621 via the user input interface 1660 or other appropriate mechanism. A wireless networking component 1674 such as comprising an interface and antenna may be coupled through a suitable device such as an access point or peer computer to a WAN or LAN. In a networked environment, program modules depicted relative to the computer 1610, or portions thereof, may be stored in the remote memory storage device. By way of example, and not limitation, FIG. 16 illustrates remote application programs 1685 as residing on memory device 1681. It may be appreciated that the network connections shown are exemplary and other means of establishing a communications link between the computers may be used.

An auxiliary subsystem 1699 (e.g., for auxiliary display of content) may be connected via the user interface 1660 to allow data such as program content, system status and event notifications to be provided to the user, even if the main portions of the computer system are in a low power state. The auxiliary subsystem 1699 may be connected to the modem 1672 and/or network interface 1670 to allow communication between these systems while the main processing unit 1620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
processing an image into objects, including tiling the image into non-overlapping tiles, obtaining a tile size parameter set and dividing pixels of the image into tiles comprising rows and columns based on the tile size parameter set;
segmenting the tiles into regions;
merging the tiles including by merging the regions of each tile;
detecting a small tile that does not meet a minimum size threshold;
combining the small tile with an adjacent tile into a combined tile; and
splitting the combined tile into tiles that each meet the minimum size threshold.

2. The method of claim 1 wherein segmenting the tiles into regions comprises writing information for each region into a data structure, including data corresponding to region size, region boundary and region neighbor.

3. The method of claim 1 wherein merging the tiles comprises horizontally merging columns of tiles into row blocks, and vertically merging the row blocks.

4. The method of claim 1 wherein merging the tiles comprises vertically merging rows of tiles into column blocks, and horizontally merging the column blocks.

5. The method of claim 1 wherein merging the tiles comprises merging a pair of tiles in a parallel operation with merging at least one other pair of tiles.

6. The method of claim 1 wherein merging the tiles comprises determining a set of pairs of candidate regions, determining a pair of regions in the set having a minimum merging cost, and merging the pair of regions having the minimum merging cost into a merged region.

7. The method of claim 6 further comprising, updating the merged region based on neighbor region relationships, updating regions that neighbor the merged region, removing the pair of regions corresponding to the merged region from the set, and removing any duplicate pairs from the set.

8. In a computing environment, a system comprising:
an image processing mechanism that processes an image into labeled objects, the image processing mechanism coupled to a tiling and merging framework that includes a tiling mechanism that tiles the image into a plurality of tiles;
a segmentation mechanism that segments each of the tiles into regions;
a tile merging mechanism that merges the tiles by merging regions of tiles;
a data store coupled to the tiling and merging framework, and
wherein the segmentation mechanism initially segments each of the tiles by defining a region for each pixel, and for each region, persisting a file into the data store, the file containing data comprising an identifier for that region and data associated with that region.

9. The system of claim 8 wherein the tiling mechanism includes means for using a parameter set to determine a tile size for the tiles, and means for ensuring that no tile is less than a minimum horizontal size or a minimum vertical size, or both.

10. The system of claim 8 wherein the segmentation mechanism segments at least two tiles in a parallel segmenting operation.

11. The system of claim 8, wherein the tile merging mechanism determines a set of pairs of candidate regions, merges a pair in the set into a merged region based on a merging cost, updates the merged region based on neighbor region relationships, and updates regions that neighbor the merged region.

12. The system of claim 8 wherein the segmentation mechanism is further configured to obtain a tile size parameter set and divide pixels of the image into tiles comprising rows and columns based on the tile size parameter set.

13. The system of claim 12 wherein the segmentation mechanism is further configured to detect a small tile that does not meet a minimum size threshold, combine the small tile with an adjacent tile into a combined tile, and split the combined tile into tiles that each meet the minimum size threshold.

14. The system of claim 8 wherein the tile merging mechanism is further configured to merge a pair of tiles in a parallel operation with merging at least one other pair of tiles.

15. A computer-readable storage medium not consisting of a signal, having computer-executable instructions stored thereon, which in response to execution by a computer, cause the computer to perform steps, comprising:
   (a) collecting a set of merging pairs corresponding to regions within pairs of tiles of a tiled image;
   (b) selecting a pair from the set as a selected pair;
   (c) determining if the selected pair already has a corresponding merged result, and if so, increasing a shared boundary for this selected pair, and if not, merging the selected pair into a merged result and updating information based on the merging;
   (d) updating information of at least one neighboring region based on the merging;
   (e) removing the selected pair from the set;
   (f) determining whether at least one pair remains in the set, and if not, advancing to step (i);
   (g) selecting another pair from the set;
   (h) determining whether the other pair meets a stopping threshold, and if not, returning to step (c), and if so, advancing to step (i);
   (i) if the merging at step (c) was horizontal merging, vertically merging row blocks resulting from the horizontal merging, or if the merging at step (c) was vertical merging, horizontally merging column blocks resulting from the vertical merging; and
   (j) outputting resulting image data.

16. The computer-readable storage medium of claim 15 wherein determining whether the other pair meets a stopping threshold comprises evaluating a merging cost value associated with the other pair against a maximum merging cost value.

17. The computer-readable storage medium of claim 15 having further computer-executable instructions stored thereon, which in response to execution by the computer, cause the computer to perform further steps comprising, removing any duplicate pair from the set.

18. The computer-readable storage medium of claim 15 wherein steps (a) through (h) are performed on at least two sets of data in parallel.

19. The computer-readable storage medium of claim 15 wherein vertically merging the row blocks comprises: (1) obtaining a merging result by merging one row block with an adjacent row block such that the merging result is a current merging result; (2) determining if another row block remains as an unmerged row block, and if not, advancing to step (i), and if so, merging the unmerged row block with the current merging result into a new merging result that becomes the current merging result, and repeating step (2).

20. The computer-readable storage medium of claim 15 wherein horizontally merging the column blocks comprises: (1) obtaining a merging result by merging one column block with an adjacent column block such that the merging result is a current merging result; (2) determining if another column block remains as an unmerged column block, and if not, advancing to step (i), and if so, merging the unmerged column block with the current merging result into a new merging result that becomes the current merging result, and repeating step (2).

* * * * *